(12) United States Patent
Hada et al.

(10) Patent No.: US 8,888,937 B2
(45) Date of Patent: *Nov. 18, 2014

(54) METHOD FOR CONTINUOUSLY MANUFACTURING LIQUID CRYSTAL DISPLAY DEVICE

(75) Inventors: Kazuya Hada, Ibaraki (JP); Satoshi Hirata, Ibaraki (JP); Seiji Kondo, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 403 days.

This patent is subject to a terminal disclaimer.

(21) Appl. No.: 13/185,001

(22) Filed: Jul. 18, 2011

(65) Prior Publication Data

US 2012/0180947 A1 Jul. 19, 2012

(30) Foreign Application Priority Data

Jan. 14, 2011 (JP) ................................. 2011-006038

(51) Int. Cl.
| | | |
|---|---|---|
| *B32B 41/00* | (2006.01) | |
| *B32B 37/12* | (2006.01) | |
| *G02F 1/13* | (2006.01) | |
| *G02F 1/1335* | (2006.01) | |

(52) U.S. Cl.
CPC ..... *G02F 1/133528* (2013.01); *B32B 2309/105* (2013.01); *B32B 41/00* (2013.01); *G02F 1/1303* (2013.01); *B32B 2457/20* (2013.01); *B32B 37/12* (2013.01)
USPC .............................. 156/64; 156/230; 156/249

(58) Field of Classification Search
USPC .................................... 156/64, 230, 249, 358
See application file for complete search history.

(56) References Cited

U.S. PATENT DOCUMENTS

| | | | |
|---|---|---|---|
| 7,022,204 B2 | 4/2006 | Kanbara et al. | |
| 8,128,769 B1 * | 3/2012 | Hada et al. .................... | 156/64 |

(Continued)

FOREIGN PATENT DOCUMENTS

| | | |
|---|---|---|
| EP | 2093041 A1 | 8/2009 |
| JP | 57-052017 A | 3/1982 |

(Continued)

OTHER PUBLICATIONS

Japanese Office Action for Patent Application No. 2011-006038, mailing date of Mar. 15, 2011.

(Continued)

*Primary Examiner* — George Koch
(74) *Attorney, Agent, or Firm* — Westerman, Hattori, Daniels & Adrian, LLP (57) ABSTRACT

The method for continuously manufacturing a liquid crystal display device, includes:
a peeling step of peeling off a sheet piece of a pressure-sensitive adhesive-containing polarizing film from a carrier film;
a taking-up step of taking up the carrier film;
a bonding step of bonding the sheet piece to a liquid crystal panel with the pressure-sensitive adhesive interposed therebetween; and
a velocity control step of controlling V1 and V2 so that in a process of bonding the sheet piece to the liquid crystal panel, the relation V1=V2 can be satisfied during a period from a bonding start time when bonding the sheet piece to the liquid crystal panel is started to a time when the sheet piece is peeled off from the carrier film and that the relation V1<V2 can be satisfied at a certain time after the sheet piece in a course of being bonded to the liquid crystal panel is peeled from the carrier film and before the bonding of the sheet piece to the liquid crystal panel is completed, wherein V1 represents a velocity at which the carrier film is taken up, and V2 represents a velocity at which the sheet piece is bonded.

1 Claim, 5 Drawing Sheets

(56) References Cited

U.S. PATENT DOCUMENTS

| | | | |
|---|---|---|---|
| 8,485,241 B2 * | 7/2013 | Hirata et al. ................ | 156/540 |
| 2005/0174526 A1 | 8/2005 | Yu | |
| 2006/0185796 A1 | 8/2006 | Hayasaka et al. | |
| 2007/0204961 A1 | 9/2007 | Nakashima et al. | |
| 2009/0199950 A1 | 8/2009 | Kitada et al. | |
| 2009/0260738 A1 | 10/2009 | Kitada et al. | |
| 2010/0283943 A1 | 11/2010 | Kimura et al. | |
| 2010/0288420 A1 | 11/2010 | Kimura et al. | |
| 2010/0288441 A1 | 11/2010 | Kitada et al. | |
| 2010/0316817 A1 | 12/2010 | Kimura et al. | |
| 2010/0326589 A1 | 12/2010 | Koshio et al. | |

FOREIGN PATENT DOCUMENTS

| | | | |
|---|---|---|---|
| JP | 64-48759 A | 2/1989 | |
| JP | 8-022012 A | 1/1996 | |
| JP | 10-151717 A | 6/1998 | |
| JP | 2002-127258 A | 5/2002 | |
| JP | 2004-276579 A | 10/2004 | |
| JP | 2004-338408 A | 12/2004 | |
| JP | 2004-361741 A | 12/2004 | |
| JP | 2005-306604 A | 11/2005 | |
| JP | 2006-007621 A | 1/2006 | |
| JP | 2007-083647 A | 4/2007 | |
| JP | 2007-083666 A | 4/2007 | |
| JP | 2009-271521 A | 11/2009 | |
| JP | 2010-030744 A | 2/2010 | |
| JP | 4689763 B1 | 5/2011 | |
| KR | 10-2005-0079720 A | 8/2005 | |
| KR | 10-1034111 B1 | 5/2011 | |
| TW | 200844029 A | 11/2008 | |
| TW | 201008726 A1 | 3/2010 | |
| WO | 2007/034991 A1 | 3/2007 | |
| WO | 2007/034993 A1 | 3/2007 | |
| WO | 2009-128207 A1 | 10/2009 | |

OTHER PUBLICATIONS

Office Action dated Feb. 1, 2013, issued in corresponding European Patent Application No. 11174773.9.
European Search Report dated Dec. 14, 2011, issued in corresponding European Patent Application No. 11174773.9.
European Office Action dated May 18, 2012, issued in corresponding European Patent Application No. 11174773.9 (5 pages).
Japanese Office Action dated Dec. 10, 2010, issued in Japanese Patent Application No. 2010-218238 with English translation (4 pages).
Notice of Allowance of Korean Application No. 10-2011-4602, mailing date of Apr. 6, 2011 with English translation (3 pages).
Taiwanese Office Action dated Oct. 31, 2011, issued in Taiwanese Patent Application No. 099137669 with English translation.
Japanese Office Action dated Dec. 6, 2011, issued in Japanese Patent Application No. 2010-260464.(w/partial English translation) (4 pages).
Japanese Office Action, dated Aug. 9, 2011, application No. 2010-260464 with English translation (4 pages).
U.S. Non-Final Office Action dated Sep. 1, 2011, issued in related U.S. Appl. No. 13/081,610 (now U.S. Patent No. 8,128,769) (17 pages).
U.S. Notice of Allowance dated Dec. 17, 2011, issued in related U.S. Appl. No. 13/081,610 (now U.S. Patent No. 8,128,769) (7 pages).
U.S. Non-Final Office Action dated Nov. 6, 2012, issued in related U.S. Appl. No. 13/271,665 (now U.S. Patent No. 8,485,241) (18 pages).
U.S. Notice of Allowance dated May 1, 2013, issued in related U.S. Appl. No. 13/271,665 (now U.S. Patent No. 8,485,241) (8 pages).
Taiwanese Office Action dated Feb. 6, 2014, issued in corresponding Taiwanese application No. 100102141, w/English translation (9 pages).
Taiwanese Search Report dated Aug. 11, 2014, issued in related Taiwanese Patent Application No. 100122925, with English Translation (2 pages).

* cited by examiner

METHOD FOR CONTINUOUSLY MANUFACTURING LIQUID CRYSTAL DISPLAY DEVICE

BACKGROUND OF THE INVENTION

1. Field of the Invention

The invention relates to a system and a method for continuously manufacturing a liquid crystal display device by a process including peeling off a sheet piece of a polarizing film from a carrier film and bonding the sheet piece to a liquid crystal panel with a pressure-sensitive adhesive interposed therebetween.

2. Description of the Related Art

A known method for continuously manufacturing a liquid crystal display device includes providing a carrier film on which a sheet piece of a polarizing film is formed with a pressure-sensitive adhesive interposed therebetween, peeling off the sheet piece of the polarizing film together with the pressure-sensitive adhesive from the carrier film by inwardly folding back the carrier film at the front end of peeling means, and bonding the sheet piece of the polarizing film, which is peeled off, to a liquid crystal panel with the pressure-sensitive adhesive interposed therebetween by bonding means, while feeding the liquid crystal panel (see Japanese Patent Application Laid-Open (JP-A) No. 2004-361741).

The system disclosed in Japanese Patent Application Laid-Open (JP-A) No. 2004-361741 for continuously manufacturing a liquid crystal display device is required to continuously produce a liquid crystal display device at a velocity as high as possible. In the process of bonding the sheet piece to the liquid crystal panel (bonding process), therefore, the velocity $V1$ at which the carrier film is taken up and the bonding velocity $V2$ should preferably be set as equal as possible. In addition, the bonding process itself should preferably be performed at a velocity as high as possible (the bonding velocity $V2$ should preferably be set as high as possible). On the other hand, the interval between the bonding processes (for example, the time required to align the sheet piece) should be reduced. For this purpose, the take-up velocity $V1$ should preferably be reduced as much as possible before the carrier film is stopped so that the carrier film can be stopped with high accuracy.

It is therefore disclosed that the bonding process includes bonding a sheet piece to a liquid crystal panel at a high velocity, while keeping the carrier film take-up velocity $V1$ and the bonding velocity $V2$ are kept equal to each other ($V1=V2$) until an intermediate time during the bonding, then temporarily reducing the take-up velocity $V1$ and the bonding velocity $V2$, while keeping them equal to each other, and further making the carrier film take-up velocity $V1$ smaller than the bonding velocity $V2$ (Japanese Patent Application Laid-Open (JP-A) No. 2004-338408).

Prior art document: Japanese Patent Application Laid-Open (JP-A) No. 2004-361741 and Japanese Patent Application Laid-Open (JP-A) No. 2004-338408.

However, pressure-sensitive adhesive portions, which are formed on sheet pieces adjacent to each other with a score line therebetween, adhere to each other after the score line is formed. In such a case, when the velocities are controlled as described in Japanese Patent Application Laid-Open (JP-A) No. 2004-338408, namely, controlled in such a manner that $V1<V2$ is established when the next sheet piece following the sheet piece being bonded reaches the front end of peeling means (or when the rear end of the sheet piece being bonded reaches the front end of peeling means), the sheet piece being bonded is separated from the next sheet piece in such a state that the front end of the next sheet piece being fed together with the carrier film is slightly curled (slightly folded back) on the front end of the peeling means, so that air voids may be more likely to be formed due to adhesive lacking (loss of part of the pressure-sensitive adhesive) or adhesive deposit (deposition caused by chipping of part of the pressure-sensitive adhesive).

SUMMARY OF THE INVENTION

The invention has been made under the circumstances described above, and an object of the invention is to provide a system and a method for continuously manufacturing a liquid crystal display device, which can suppress the generation of air voids caused by adhesive lacking or adhesive deposit in the process of bonding a sheet piece of a polarizing film to a liquid crystal panel.

As a result of investigations to solve the problems, the invention described below has been accomplished.

The invention is directed to a system for continuously manufacturing a liquid crystal display device, which includes:

peeling means that peels off a sheet piece of a pressure-sensitive adhesive-containing polarizing film from a carrier film by inwardly folding back the carrier film at its front end, wherein sheet pieces of the pressure-sensitive adhesive-containing polarizing film are formed adjacent to one another on the carrier film with the pressure-sensitive adhesive interposed therebetween;

take-up means that takes up the carrier film from which the sheet piece is peeled off by the peeling means;

bonding means that bonds the sheet piece, which is peeled off by the peeling means, to a liquid crystal panel with the pressure-sensitive adhesive interposed therebetween while feeding the liquid crystal panel so that a liquid crystal display device can be formed; and velocity control means that controls the take-up means and the bonding means so that in the process of bonding the sheet piece to the liquid crystal panel, the relation $V1=V2$ can be satisfied during a period from a bonding start time when bonding the sheet piece to the liquid crystal panel is started to a time when the sheet piece is peeled off from the carrier film by the front end of the peeling means and that the relation $V1<V2$ can be satisfied at a certain time after the sheet piece in a course of being bonded to the liquid crystal panel is peeled from the carrier film by the front end of the peeling means and before the bonding of the sheet piece to the liquid crystal panel is completed, wherein $V1$ represents a velocity at which the carrier film is taken up by the take-up means, and $V2$ represents a velocity at which the bonding is performed by the bonding means.

According to this feature, the take-up velocity $V1<$the bonding velocity $V2$ is established after the sheet piece being bonded is peeled by the front end of the peeling means, so that the sheet piece being bonded and the next sheet piece can be prevented from being separated in such a state that the next sheet piece is slightly curled (slightly folded back) on the front end of the peeling means, and therefore, adhesive lacking or adhesive deposit can be suppressed, so that such lacking- or deposit-induced sheet piece bonding defects (the generation of air voids) can be prevented.

In an embodiment of the invention, the velocity control means may control the take-up means and the bonding means so that the relation $V1=V2$ can be satisfied during a period from the bonding start time when bonding the sheet piece to the liquid crystal panel is started to a time before the relation $V1<V2$ is established.

According to this feature, the take-up velocity V1 and the bonding velocity V2 are kept equal to each other from the bonding start time to an intermediate time, and then the take-up velocity V1<the bonding velocity V2 is established. The relation V1=V2 is intended to include not only the case where the velocities are completely equal to each other but also cases where the velocities are substantially equal to each other, for example, which means that the velocities are substantially equal to each other even when there is a deviation (for example, a deviation of ±5%) from the same velocity (the set value) due to any of various errors such as control, equipment, and measurement errors.

In an embodiment of the invention, the velocity control means may control the take-up means and the bonding means so that V1 and V2 can be reduced before the relation V1<V2 is established.

According to this feature, the take-up velocity V1 and the bonding velocity V2 are temporarily made low (reduced), so that the take-up velocity V1 and the bonding velocity V2 before the velocity reduction can be set high (the sheet piece can be bonded to the liquid crystal panel at a high velocity). In addition, the take-up velocity V1 can be made low before the carrier film is stopped, so that the carrier film can be stopped with high accuracy and that the interval between the bonding processes (for example, the time required to align the sheet piece) can be reduced. In addition, since V1 is temporarily reduced before V1<V2 is established, the next sheet piece following the sheet piece being bonded can more stably pass through the front end of the peeling means, so that adhesive lacking or adhesive deposit can be suppressed as described above in the process of bonding the sheet piece to the liquid crystal panel, when the take-up velocity V1<the bonding velocity V2 is established after the sheet piece being bonded is peeled by the front end of the peeling means. Thus, the liquid crystal display device can be continuously produced at high velocity, while adhesive lacking- or deposit-induced air void generation is suppressed.

In an embodiment of the invention, the timing of the velocity control means to make the carrier film take-up velocity V1 smaller than the sheet piece bonding velocity V2, the relatively reduced velocity, and the like may be appropriately controlled in view of the prevention of entangling of the next sheet piece with the boding means.

The invention also directed to a method for continuously manufacturing a liquid crystal display device, includes:

a peeling step of peeling off a sheet piece of a pressure-sensitive adhesive-containing polarizing film from a carrier film by inwardly folding back the carrier film, wherein sheet pieces of the pressure-sensitive adhesive-containing polarizing film are formed adjacent to one another on the carrier film with the pressure-sensitive adhesive interposed therebetween;

a taking-up step of taking up the carrier film from which the sheet piece is peeled off by the peeling step;

a bonding step of bonding the sheet piece, which is peeled off by the peeling step, to a liquid crystal panel with the pressure-sensitive adhesive interposed therebetween while feeding the liquid crystal panel so that a liquid crystal display device can be formed; and a velocity control step of controlling V1 and V2 so that in a process of bonding the sheet piece to the liquid crystal panel, the relation V1=V2 can be satisfied during a period from a bonding start time when bonding the sheet piece to the liquid crystal panel is started to a time when the sheet piece is peeled off from the carrier film and that the relation V1<V2 can be satisfied at a certain time after the sheet piece in a course of being bonded to the liquid crystal panel is peeled from the carrier film and before the bonding of the sheet piece to the liquid crystal panel is completed, wherein V1 represents a velocity at which the carrier film is taken up, and V2 represents a velocity at which the sheet piece is bonded.

According to this feature, the take-up velocity V1<the bonding velocity V2 is established after the sheet piece being bonded is peeled, so that the sheet piece being bonded and the next sheet piece can be prevented from being separated in such a state that the next sheet piece is slightly curled (slightly folded back) on the front end of the peeling means, and therefore, adhesive lacking or adhesive deposit can be suppressed, so that such lacking- or deposit-induced sheet piece bonding defects (the generation of air voids) can be prevented.

In an embodiment of the invention, the velocity control step may include controlling V1 and V2 so that the relation V1=V2 can be satisfied during a period from the bonding start time when bonding the sheet piece to the liquid crystal panel is started to a time before the relation V1<V2 is established.

According to this feature, the take-up velocity V1 and the bonding velocity V2 are kept equal to each other from the bonding start time to an intermediate time, and then the take-up velocity V1<the bonding velocity V2 is established.

In an embodiment of the invention, the velocity control step may include controlling V1 and V2 so that V1 and V2 can be reduced before the relation V1<V2 is established.

According to this feature, the take-up velocity V1 and the bonding velocity V2 are temporarily made low (reduced), so that the take-up velocity V1 and the bonding velocity V2 before the velocity reduction can be set high (the sheet piece can be bonded to the liquid crystal panel at a high velocity). In addition, the take-up velocity V1 can be made low before the carrier film is stopped, so that the carrier film can be stopped with high accuracy and that the interval between the bonding processes (for example, the time required to align the sheet piece) can be reduced. In addition, since V1 is temporarily reduced before V1<V2 is established, the next sheet piece following the sheet piece being bonded can more stably pass through the front end of the peeling means, so that adhesive lacking or adhesive deposit can be suppressed as described above in the process of bonding the sheet piece to the liquid crystal panel, when the take-up velocity V1<the bonding velocity V2 is established after the sheet piece being bonded is peeled by the front end of the peeling means. Thus, the liquid crystal display device can be continuously produced at high velocity, while adhesive lacking- or deposit-induced air void generation is suppressed.

DETAILED DESCRIPTION OF THE PREFERRED EMBODIMENTS

Polarizing Film and Continuous Roll

In an embodiment of the invention, the polarizing film may be formed on the carrier film in any mode. For example, they may be wound to form a continuous roll. For example, the continuous roll may be (1) a roll of an optical film laminate including a carrier film and a pressure-sensitive adhesive-containing polarizing film formed on the carrier film with the pressure-sensitive adhesive interposed therebetween. In this case, the system for continuously manufacturing a liquid crystal display device has cutting means for cutting the polarizing film into sheet pieces of the polarizing film in such a manner that the polarizing film are cut at predetermined intervals, while the carrier film is left uncut (cutting means for performing half-cutting). For example, the cutting may be performed in such a manner as to classify non-defective and defective sheet pieces based on the result of an inspection performed using a defect inspection apparatus in the continuous manufacturing system.

Alternatively, for example, the continuous roll may be (2) a roll of an optical film laminate including a carrier film and sheet pieces of a pressure-sensitive adhesive-containing polarizing film, which are formed adjacent to one another on the carrier film with the pressure-sensitive adhesive interposed therebetween (a continuous roll of a so-called scored polarizing film).

Figure 1:
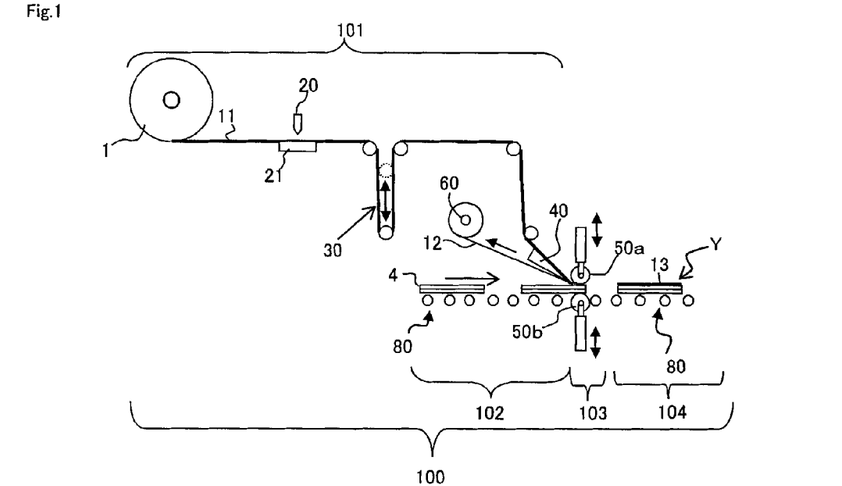
FIG. 1 is a schematic diagram showing an example of the liquid crystal display device manufacturing system.

For example, the first continuous roll 1 shown in FIG. 1 is a roll of a first optical film laminate 11 including a first carrier film 12 and a first polarizing film 13 formed on the first carrier film 12 with a first pressure-sensitive adhesive interposed therebetween.

For example, the polarizing film includes a polarizer (about 10 to about 30 μm in thickness) and a polarizer protecting film or films (about 20 to about 80 μm in thickness) formed on one or both sides of the polarizer with an adhesive or a pressure-sensitive adhesive. The first optical film laminate 11 may further include any other film such as a retardation film (20 to 80 μm in thickness), a viewing angle compensation film, a brightness enhancement film, or a surface protecting film (about 20 to about 50 μm in thickness). The thickness of the optical film laminate is typically in the range of 50 μm to 400 μm. The pressure-sensitive adhesive interposed between the polarizing film and the carrier film may be of any type such as an acryl-based pressure-sensitive adhesive, a silicone pressure-sensitive adhesive, or a urethane pressure-sensitive adhesive. For example, the thickness of the pressure-sensitive adhesive layer may be from 10 to 40 μm. For example, the carrier film to be used may be such a known conventional film as a plastic film (e.g., a polyethylene terephthalate film or a polyolefin film). According to conventional techniques, any appropriate film such as a film coated with an appropriate release agent such as a silicone, long-chain alkyl or fluoride release agent, or molybdenum sulfide may also be used as needed.

Liquid Crystal Display Device

The liquid crystal display device includes a liquid crystal panel and a sheet piece or pieces of a polarizing film provided on one or both sides of the liquid crystal panel, into which a driving circuit is incorporated as needed. Any type of liquid crystal panel such as a vertical alignment (VA) or in-plane switching (IPS) type liquid crystal panel may be used. The liquid crystal panel 4 shown in FIG. 1 has a structure including a pair of substrates (first and second substrates 41 and 42) opposed to each other and a liquid crystal layer sealed in between the substrates.

Embodiment 1

In this embodiment, the system for continuously manufacturing a liquid crystal display device includes: peeling means that peels off a sheet piece of a pressure-sensitive adhesive-containing polarizing film from a carrier film by inwardly folding back the carrier film at its front end, wherein sheet pieces of the pressure-sensitive adhesive-containing polarizing film are formed adjacent to one another on the carrier film with the pressure-sensitive adhesive interposed therebetween; take-up means that takes up the carrier film from which the sheet piece is peeled off by the peeling means; and bonding means that bonds the sheet piece, which is peeled off by the peeling means, to a liquid crystal panel with the pressure-sensitive adhesive interposed therebetween while feeding the liquid crystal panel so that a liquid crystal display device can be formed. The system also includes velocity control means that controls the take-up means and the bonding means so that in the process of bonding the sheet piece to the liquid crystal panel, the relation $V1<V2$ can be satisfied during a period after the sheet piece in a course of being bonded to the liquid crystal panel is peeled from the carrier film by the front end of the peeling means and before the bonding of the sheet piece to the liquid crystal panel is completed, wherein V1 represents a velocity at which the carrier film is taken up by the take-up means, and V2 represents a velocity at which the bonding is performed by the bonding means. In the embodiment, the velocity control means controls the take-up means and the bonding means so that the relation $V1=V2$ can be satisfied during a period from the bonding start time when bonding the sheet piece to the liquid crystal panel is started to a time before the relation $V1<V2$ is established. The system and method according to the embodiment for continuously manufacturing a liquid crystal display device are more specifically described below with reference to FIG. 1, which are not intended to limit the scope of the invention.

The system for continuously manufacturing a liquid crystal display device includes a first sheet piece laminating apparatus 100 including first carrier film feeding means 101, first liquid crystal panel feeding means 102, first bonding means 103 (including a first bonding roller 50a and a first drive roller 50b), and second liquid crystal panel feeding means 104. The first sheet piece laminating apparatus 100 performs a lamination process including bonding a sheet piece 13 of a polarizing film to one surface of a liquid crystal panel 4. The system for continuously manufacturing a liquid crystal display device further includes a second sheet piece laminating apparatus (not shown), which performs a lamination process including bonding a sheet piece of a polarizing film to the other surface of the liquid crystal panel. The second sheet piece laminating apparatus includes means similar to those of the first sheet piece laminating apparatus 100. For example, the second sheet piece laminating apparatus includes second carrier film feeding means, second bonding means (including a second bonding roller and a second drive roller), and liquid crystal display device feeding means. In the embodiment, a sheet piece of a polarizing film is bonded to a liquid crystal panel from the upper side, and then after the liquid crystal panel with the sheet piece bonded thereto is turned over (upside down and optionally turned by 90°), a sheet piece of a polarizing film is bonded to the liquid crystal panel from the upper side. Alternatively, a sheet piece may be bonded to the liquid crystal panel from the lower side, and then after the liquid crystal panel is turned over, another sheet piece may be bonded to the liquid crystal panel from the lower side. Alternatively, after a sheet piece is bonded to the liquid crystal panel from the upper side, another sheet piece may be bonded to the liquid crystal panel from the lower side without turning over the liquid crystal panel, or after a sheet piece is bonded to the liquid crystal panel from the lower side, another sheet piece may be bonded to the liquid crystal panel from the upper side without turning over the liquid crystal panel.

The first liquid crystal panel feeding means 102 transports and supplies the liquid crystal panel 4 to the first bonding means 103. In the embodiment, the first liquid crystal panel feeding means 102 includes a feed roller 80, a suction plate, and other components. The liquid crystal panel 4 is fed to the downstream side of the manufacturing line by rotating the feed roller 80 or shifting the suction plate.

The first carrier film feeding means 101 feeds the first optical film laminate 11 from the first continuous roll 1, cuts the first polarizing film (containing the pressure-sensitive adhesive) at predetermined intervals to form a sheet piece 13 (first sheet piece) of the first polarizing film on the first carrier film 12, peels off the first sheet piece 13 from the first carrier film 12 by inwardly folding back the first carrier film 12 at the front end 41 of the first peeling means 40, and feeds the first sheet piece 13 to the first bonding means 103. For the operation, the first carrier film feeding means 101 includes first cutting means 20, a first dancer roller 30, first peeling means 40, and first take-up means 60.

The first cutting means 20 holds the first optical film laminate 11 from the first carrier film 12 side by suction means 21 and cuts the first polarizing film (containing the pressure-sensitive adhesive) to form the first sheet piece 13 on the first carrier film 12. For example, the first cutting means 20 may be a cutter, a laser, or the like.

The first dancer roller 30 has the function of maintaining tension on the first carrier film 12 (absorbing fluctuations in tension). The first carrier film feeding means 101 feeds the first carrier film 12 through the first dancer roller 30.

In order to bond the first sheet piece 13 to the liquid crystal panel 4, the first peeling means 40 inwardly folds back the first carrier film 12 at its front end 41 to peel off the first sheet piece 13 (containing the pressure-sensitive adhesive) from the first carrier film 12. In the embodiment, a sharp knife edge is used as a non-limiting example of the front end 41 of the first peeling means 40.

The first take-up means 60 takes up the first carrier film 12 from which the first sheet piece 13 (containing the pressure-sensitive adhesive) is peeled off by the first peeling means 40. During the process of bonding the first sheet piece 13, the velocity V1 at which the first carrier film 12 is taken up by the first take-up means 60 is controlled by first velocity control means 110 as described below.

The first bonding means 103 bonds the first sheet piece 13, which is peeled off by the first peeling means 40, to the liquid crystal panel 4 from the upper side with the pressure-sensitive adhesive interposed therebetween, when the liquid crystal panel 4 is fed by the first liquid crystal panel feeding means 102. In the embodiment, the first bonding means 103 includes a first bonding roller 50a and a first drive roller 50b. During the process of bonding the first sheet piece 13, the velocity of the rotation of the first drive roller 50b is controlled by the velocity control means 110 described below. It has a mechanism in which as the first drive roller 50b is driven, the first bonding roller 50a is driven accordingly. Such a mechanism is non-limiting, and alternatively, the relationship between the driver and the follower may be reversed in the mechanism, or both may be drive mechanisms.

Figure 2:
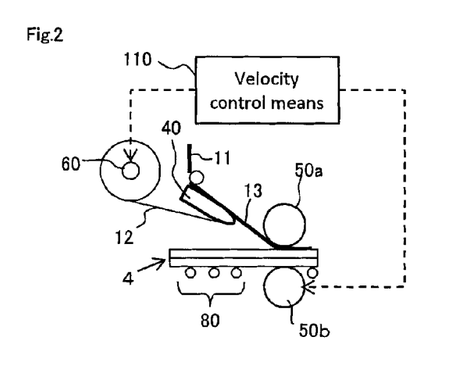
FIG. 2 is a schematic diagram showing an example of the liquid crystal display device manufacturing system.
Figure 3:
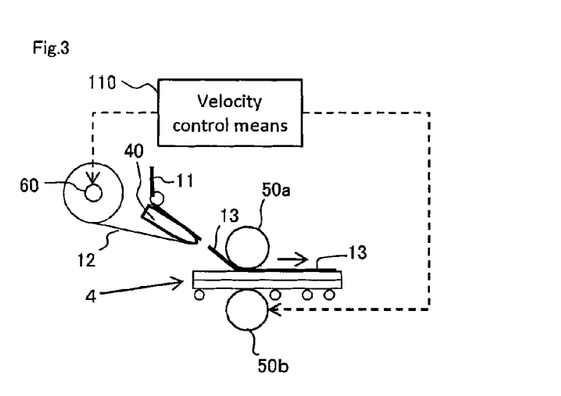
FIG. 3 is a schematic diagram showing an example of the liquid crystal display device manufacturing system.

The first velocity control means 110 controls the first take-up means 60 and the first bonding means 103 (specifically, the first drive roller 50b) synchronously so that the velocity V1 at which the first carrier film 12 is taken up and the velocity V2 at which the sheet piece is bonded to the liquid crystal panel 4 (the sheet piece feed velocity) can be controlled during the process of bonding the first sheet piece 13 (see FIGS. 2 and 3).

For example, the first velocity control means 110 may control the first take-up means 60 so that the velocity at which the first carrier film 12 is taken up can be controlled. Alternatively, a feed roller (not shown) located downstream of the front end 41 of the first peeling means 40 may be controlled so that the first carrier film 12 feed velocity (corresponding to the take-up velocity V1) can be controlled. The first velocity control means 110 may also control the rotational velocity of the first drive roller 50b so that the velocity V2 at which the sheet piece is bonded to the liquid crystal panel 4 can be controlled.

In the process of bonding the first sheet piece 13 to the liquid crystal panel 4, the first velocity control means 110 controls: the first take-up means 60 and the first bonding means 103 so that the velocity V1 at which the first carrier film 12 is taken up by the first take-up means 60 and the velocity V2 at which the bonding is performed by the first bonding means 103 can be reduced, while the velocities V1 and V2 are kept equal to each other; and then controls the first take-up means 60 and the first bonding means 103 so that the velocity V1 at which the first carrier film 12 is taken up can be lower than the velocity V2 at which the first sheet piece 13 is bonded to the liquid crystal panel 4 during a period after the first sheet piece 13 being bonded to the liquid crystal panel 4 is peeled from the carrier film 12 by the front end 41 of the first peeling means 40 and before the bonding of the first sheet piece 13 to the liquid crystal panel 4 is completed.

Figure 4:
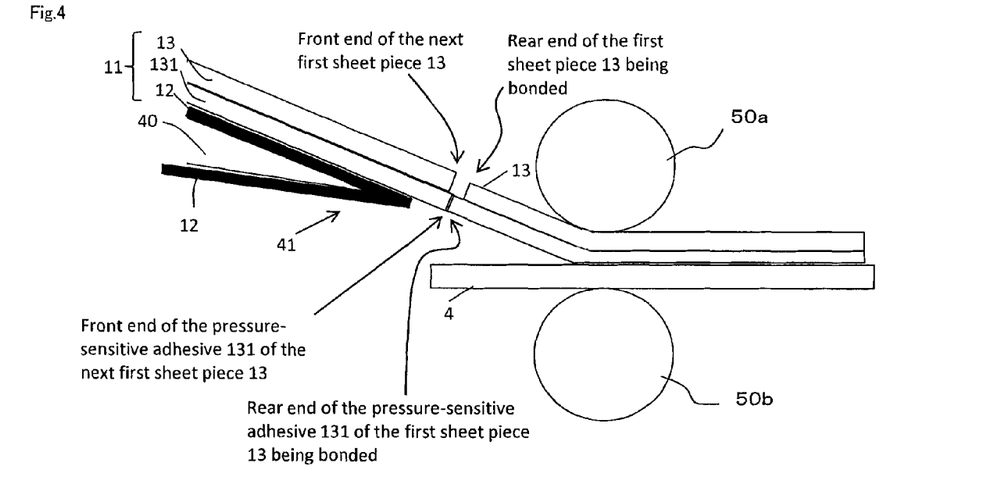
FIG. 4 is a schematic diagram showing an example of the liquid crystal display device manufacturing system.
Figure 5:
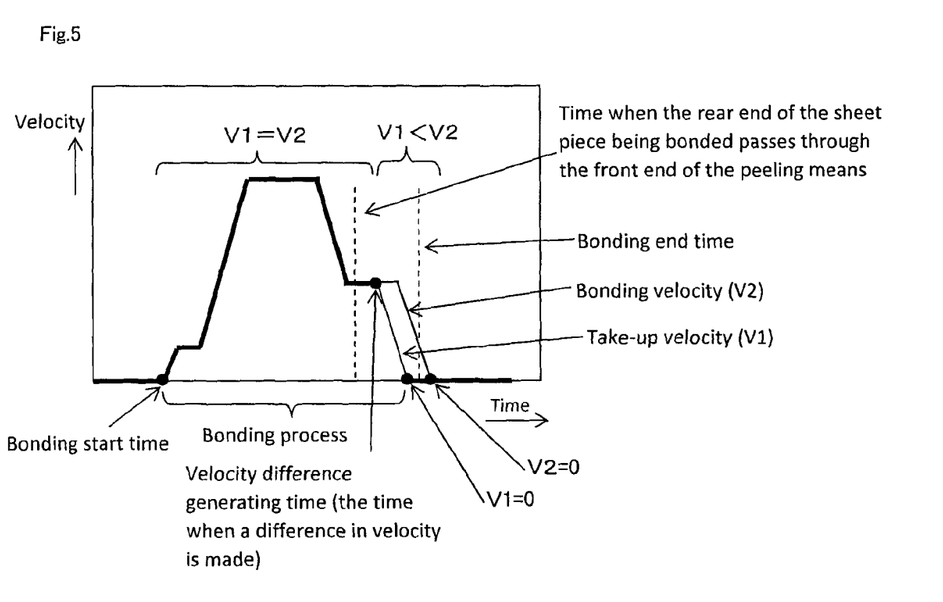
FIG. 5 is a diagram for illustrating an example of the setting of the take-up (feed) velocity (V1) and the bonding velocity (V2)

For example, the first velocity control means 110 controls the first take-up means 60 and the first bonding means 103 in such a manner that V1 and V2 satisfying V1=V2 are reduced, increased, and reduced during a period from the bonding start time when bonding the sheet piece of the polarizing film is started to the time when the rear end of the first sheet piece 13 (being bonded) (or the front end of the next sheet piece) passes through the front end 41 of the peeling means 40. Subsequently, the first velocity control means 110 controls the first take-up means 60 and the first bonding means 103 (first drive roller 50b) in such a manner that V1<V2 is satisfied during a period after the sheet piece being bonded passes through the front end 41 of the first peeling means 40 (the time when the rear end of the first sheet piece 13 comes downstream of the front end 41 of the first peeling means 40) and until the bonding end time when the bonding of the first sheet piece 13 is completed. FIG. 4 illustrates a state where the rear end of the first sheet piece 13 being bonded is located downstream of the front end 41 of the first peeling means 40. FIG. 4 shows a positional relationship in which the rear end of the first sheet piece 13 (the pressure-sensitive adhesive 131) being bonded is separated from the front end of the next first sheet piece 13 (the pressure-sensitive adhesive 131). Hereinafter, the time when the rear end of the first sheet piece 13 being bonded passes through the front end 41 of the first peeling means 40 and when the relation V1=V2 is changed to the relation V1<V2 is referred to as the "velocity difference generating time" (see FIG. 5). In the embodiment, the velocity difference generating time is also the time when the first sheet piece being bonded is separated from the next first sheet piece. This feature makes it possible not only to bond the sheet piece of the polarizing film to the liquid crystal panel at high velocity but also to prevent the sheet piece being bonded and the next sheet piece from being separated in such a state that the next sheet following the sheet piece being bonded is slightly curled on the front end of the peeling means, so that adhesive lacking or adhesive deposit can be suppressed and therefore sheet piece bonding defects (such as defects caused by the generation of air voids), which would otherwise be caused by the adhesive lacking or deposit, can be successfully suppressed.

The second liquid crystal panel feeding means 104 transports and supplies, to the second bonding means, the liquid crystal panel 4 with the first sheet piece 13 bonded thereto by the first bonding means 103. The second liquid crystal panel feeding means 104 includes a turning mechanism (not shown) for horizontally turning by 90° the liquid crystal panel 4 with the first sheet piece 13 bonded thereto and a turn-over mechanism for turning over the liquid crystal panel 4 with the first sheet piece 13 bonded thereto.

As mentioned above, the second sheet piece laminating apparatus (not shown) is provided for bonding another sheet piece of a polarizing film to the other surface of the liquid crystal panel 4. Various means and apparatuses as described above for the first sheet piece laminating apparatus 100 may be used in the second sheet piece laminating apparatus. The second carrier film feeding means may have the same device configuration as the first carrier film feeding means, and the second bonding means may have the same device configuration as the first bonding means. For example, the second dancer roller may have the same device configuration as the first dancer roller 30, the second take-up means may have the same device configuration as the first take-up means 60, and the second bonding roller and the second drive roller may have the same mechanism as the first bonding roller 50a and the first drive roller 50b. The second velocity control means may also have the same function as the first velocity control means 110.

The liquid crystal display device feeding means (not shown) may include a feed roller, a suction plate or any other component for feeding downstream the liquid crystal display device Y formed by the second bonding means. An inspection apparatus for inspecting the liquid crystal display device Y may also be provided at a downstream feed site. The purpose and method of the inspection using the inspection apparatus are not restricted.

Continuous Manufacturing Method

In the embodiment, the method for continuously manufacturing a liquid crystal display device includes: a peeling step of peeling off a sheet piece of a pressure-sensitive adhesive-containing polarizing film from a carrier film by inwardly folding back the carrier film, wherein sheet pieces of the pressure-sensitive adhesive-containing polarizing film are formed adjacent to one another on the carrier film with the pressure-sensitive adhesive interposed therebetween; a taking-up step of taking up the carrier film from which the sheet piece is peeled off by the peeling step; and a bonding step of bonding the sheet piece, which is peeled off by the peeling step, to a liquid crystal panel with the pressure-sensitive adhesive interposed therebetween while feeding the liquid crystal panel so that a liquid crystal display device can be formed. The method also includes a velocity control step of controlling V1 and V2 so that in the process of bonding the sheet piece to the liquid crystal panel, the relation $V1<V2$ can be satisfied during a period after the sheet piece in a course of being bonded to the liquid crystal panel is peeled from the carrier film and before the bonding of the sheet piece to the liquid crystal panel is completed, wherein V1 represents a velocity at which the carrier film is taken up, and V2 represents a velocity at which the sheet piece is bonded. In the embodiment, velocity control means controls V1 and V2 so that the relation $V1=V2$ can be satisfied during a period from the bonding start time when bonding the sheet piece to the liquid crystal panel is started to a time before the relation $V1<V2$ is established.

In the embodiment, the first optical film laminate 11 is fed from the first continuous roll 1 which is a roll of the first optical film laminate 11 including the first carrier film 12 and the first polarizing film formed on the first carrier film 12. The first polarizing film (containing the pressure-sensitive adhesive) is then cut while the first carrier film 12 is left (uncut), so that a first sheet piece 13 of the first polarizing film is formed on the first carrier film 12. The first carrier film 12 is then inwardly folded back at the front end 41 of the first peeling means 40 and fed so that the first sheet piece 13 (containing the pressure-sensitive adhesive) is peeled off from the first carrier film 12 (the peeling step). The first carrier film 12, from which the first sheet piece 13 is peeled off by the peeling step, is taken up by take-up means (the taking-up step). The first sheet piece 13 peeled off from the first carrier film 12 is then bonded to a first substrate of the liquid crystal panel 4 with the pressure-sensitive adhesive interposed therebetween (the bonding step).

The first velocity control step includes, in the process of bonding the first sheet piece 13 to the liquid crystal panel 4, controlling V1 and V2 in such a manner that the relation $V1=V2$ is satisfied from the bonding start time when bonding the first sheet piece 13 to the liquid crystal panel 4 is started to an intermediate time and that the relation $V1<V2$ is then satisfied during a period after the first sheet piece 13 being bonded to the liquid crystal panel 4 is peeled from the first carrier film 12 by the front end 41 of the first peeling means 40 and before the bonding of the first sheet piece 13 to the liquid crystal panel 4 is completed, wherein V1 represents the velocity at which the carrier film 12 is taken up by the first take-up means 60, and V2 represents the velocity at which the bonding is performed by first bonding means 103.

The continuous manufacturing method preferably further includes the step of feeding the first optical film laminate 11 (the first carrier film 12) in such a manner that tension on the first carrier film 12 can be maintained. In the embodiment, the first dancer roller 30 is used to maintain tension on the first carrier film 12.

When the polarizing film is also bonded to the other substrate of the liquid crystal panel 4, the method should further include the step of turning and turning over the liquid crystal panel. The step of turning and turning over includes horizontally turning by 90° the liquid crystal panel 4 with the sheet piece 13 of the first polarizing film bonded thereto and turning over the liquid crystal panel 4. The step of bonding a sheet piece of the second polarizing film may be performed in the same manner as the first bonding step, and the second velocity control step may also be performed in the same manner as the first velocity control step.

Other Embodiments

In Embodiment 1, the optical film laminate is fed from the continuous roll and cut at predetermined intervals (by half cutting). In the invention, this feature is non-limiting. Alternatively, for example, the optical film laminate fed from the continuous roll may be inspected for defects and cut in such a manner that defects are avoided based on the result of the inspection (by so-called skip cutting). Alternatively, defect information previously attached to the optical film laminate may be read out, and the optical film laminate may be cut in such a manner that defects are avoided based on the defect information. The defect information may include markings to indicate the defect positions.

The first and second polarizing films in the first and second continuous rolls may also have previously undergone cutting.

Specifically, the first and second continuous rolls to be used may be so-called scored continuous rolls. In this case, the first and second cutting means are unnecessary, so that the tact time can be reduced.

EXAMPLES

Sheet pieces of a polarizing film were bonded to both sides of a liquid crystal panel (40 inches) from the long side using the manufacturing system shown in FIG. 1, and the presence or absence of air voids was evaluated.

The velocity V1 at which the carrier film was taken up was reduced to less than the bonding velocity V2 at a time when the rear end of the sheet piece being bonded was located upstream of the front end of the peeling means in the feed direction (Comparative Examples) or at a time when the rear end of the sheet piece being bonded was located downstream of the front end of the peeling means in the feed direction (Examples), and after the bonding of the sheet pieces, how air voids were generated in the liquid crystal panel was evaluated.

Figure 6:
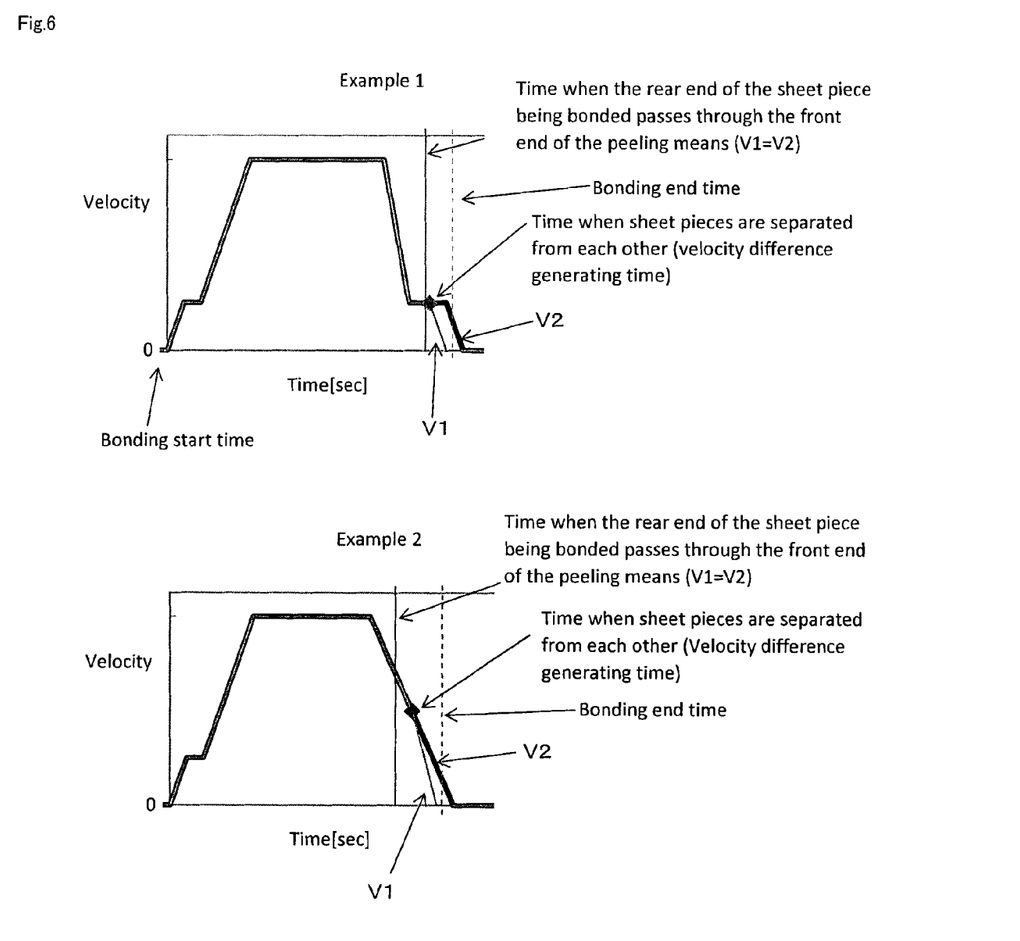
FIG. 6 is a diagram showing velocity (V1, V2) conditions in the examples.

In Example 1 shown in FIG. 6, the take-up velocity V1 and the bonding velocity V2 were reduced from the maximum velocity, while they were kept equal to each other, and then the velocities were set constant. When the velocities were constant, the rear end of the sheet piece being bonded was allowed to pass through the front end of the peeling means, and subsequently, only the take-up velocity V1 was further reduced to satisfy the relation V1<V2.

In Example 2 shown in FIG. 6, the take-up velocity V1 and the bonding velocity V2 were reduced from the maximum velocity, while they were kept equal to each other. While the take-up velocity V1 and the bonding velocity V2 were reduced, the rear end of the sheet piece being bonded was allowed to pass through the front end of the peeling means, and subsequently, only the take-up velocity V1 was further reduced to satisfy the relation V1<V2.

Figure 7:
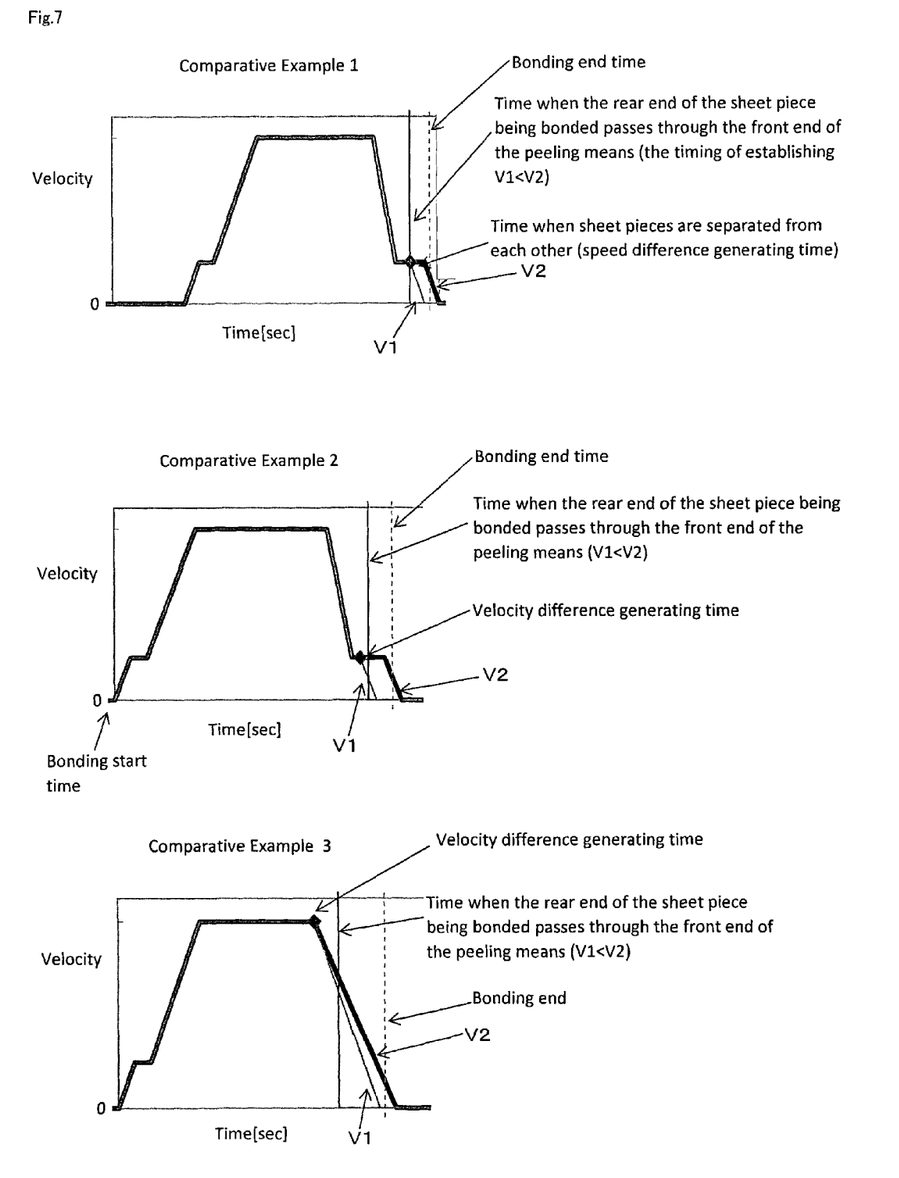
FIG. 7 is a diagram showing velocity (V1, V2) conditions in the comparative examples.

In Comparative Example 1 shown in FIG. 7, the process of Example 1 was used, except that at a time when the rear end of the sheet piece being bonded was located at the front end of the peeling means, only the take-up velocity V1 was further reduced to satisfy the relation V1<V2.

In Comparative Example 2 shown in FIG. 7, the process of Example 1 was used, except that at a time when the rear end of the sheet piece being bonded was located upstream of the front end of the peeling means in the feed direction, only the take-up velocity V1 was further reduced to satisfy the relation V1<V2.

In Comparative Example 3 shown in FIG. 7, when the take-up velocity V1 and the bonding velocity V2 were maximum and when the rear end of the sheet piece being bonded was located upstream of the front end of the peeling means in the feed direction, the take-up velocity V1 and the bonding velocity V2 were reduced from the maximum velocity in such a manner that the relation V1<V2 was maintained.

Evaluation Method

In each of the examples and the comparative examples, the sheet pieces of the polarizing film were bonded to both surfaces of each of 300 liquid crystal panels, and the presence or absence of air voids in the products was visually inspected. In the visual inspection, air voids formed by adhesive lacking or adhesive deposit in the front and rear parts of the sheet pieces were observed. Table 1 shows the results.

TABLE 1

| | Timing of setting a velocity difference V1 < V2 | Air void generation rate (%) n = 300 |
|---|---|---|
| Example 1 | At a time when the rear end of the sheet piece being bonded is located downstream of the front end of the peeling means | 0.0 |
| Example 2 | At a time when the rear end of the sheet piece being bonded is located downstream of the front end of the peeling means | 0.0 |
| Comparative Example 1 | At a time when the rear end of the sheet piece being bonded is located at the front end of the peeling means | 0.7 |
| Comparative Example 2 | At a time when the rear end of the sheet piece being bonded is located upstream of the front end of the peeling means | 0.7 |
| Comparative Example 3 | At a time when the rear end of the sheet piece being bonded is located upstream of the front end of the peeling means | 1.0 |

The results in Table 1 show that no air void was generated in Example 1 or 2, while air voids were generated in Comparative Examples 1 to 3. It is considered that in Comparative Example 1, due to the low-velocity feeding, the sheet piece being bonded was separated from the next sheet piece in such a state that the front end of the next sheet piece being fed together with the carrier film was slightly curled on the front end of the peeling means, so that air voids were generated by adhesive lacking or adhesive deposit. It is considered that in Comparative Example 2, the sheet piece being bonded was separated from the carrier film at a relatively high velocity (so that the sheet piece being bonded was forced to move to the bonding means and that the carrier film was forced to return to the upstream side by the dancer roller), so that adhesive lacking or adhesive deposit was caused by a large shock during the separation and, as a result, air voids were formed.

What is claimed is:

1. A method for continuously manufacturing a liquid crystal display device, comprising:
   a peeling step of peeling off a sheet piece of a pressure-sensitive adhesive-containing polarizing film from a carrier film by inwardly folding back the carrier film with a peeling means, wherein sheet pieces of the pressure-sensitive adhesive-containing polarizing film are formed adjacent to one another on the carrier film with the pressure-sensitive adhesive interpose therebetween;
   a taking-up step of taking up the carrier film from which the sheet piece is peeled off by the peeling step;
   a bonding step of bonding the sheet piece, which is peeled off by the peeling step, to a liquid crystal panel with the pressure-sensitive adhesive interposed therebetween while feeding the liquid crystal panel so that a liquid crystal display device can be formed; and
   a velocity control step of controlling V1 and V2 so that in a process of bonding the sheet piece to the liquid crystal panel, the relation V1=V2 can be satisfied during a period from a bonding start time when bonding the sheet piece to the liquid crystal panel is started to a time when the sheet piece is peeled off from the carrier film and that the relation V1<V2 is satisfied during a period after a rear end of the sheet piece being bonded to the liquid crystal panel becomes downstream of a front end of the peeling means and before the bonding of the sheet piece to the liquid crystal panel is completed, wherein V1 represents a velocity at which the carrier film is taken up, and V2 represents a velocity at which the sheet piece is bonded, wherein in the velocity control step, V1 and V2 are controlled so that the relation V1=V2 can be satisfied during a period from a bonding start time when bonding the sheet piece to the liquid crystal panel is started to a time before the relation V1<V2 is established, and wherein in the velocity control step, V1 and V2 are controlled so that V1 and V2 can be reduced before the relation V1<V2 is established.

* * * * *